D. J. HAVENSTRITE.
Traction Engine.

No. 231,569. Patented Aug. 24, 1880.

WITNESSES:
Chas. Nida
C. Sedgwick

INVENTOR:
D. J. Havenstrite
BY
ATTORNEYS.

UNITED STATES PATENT OFFICE.

DAVID J. HAVENSTRITE, OF NEWARK, NEW JERSEY.

TRACTION-ENGINE.

SPECIFICATION forming part of Letters Patent No. 231,569, dated August 24, 1880.

Application filed February 28, 1880.

*To all whom it may concern:*

Be it known that I, DAVID J. HAVENSTRITE, of Newark, in the county of Essex and State of New Jersey, have invented a new and useful Improvement in Traction-Engines, of which the following is a specification.

Figure 1:
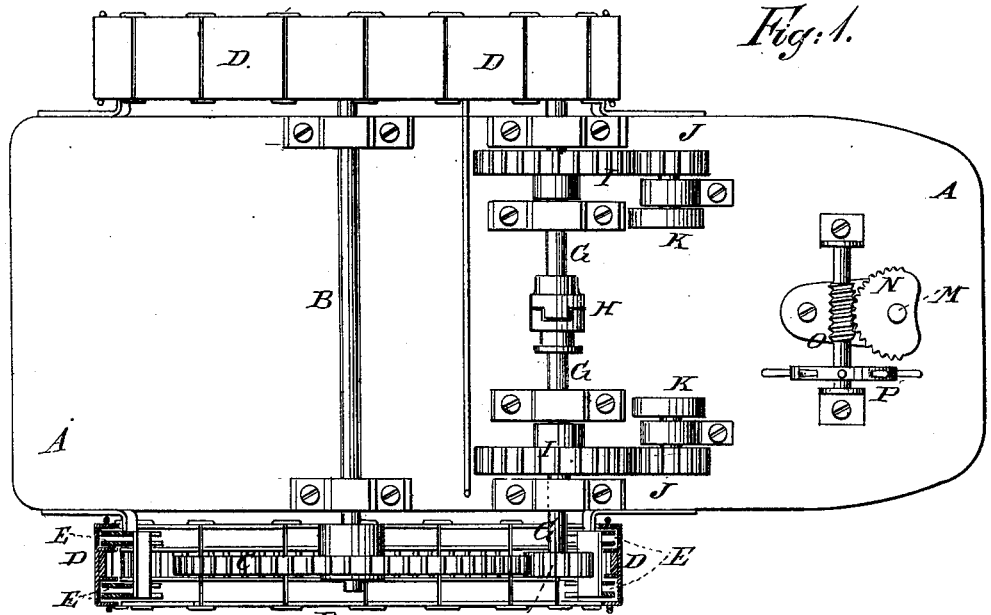
Figure 2:
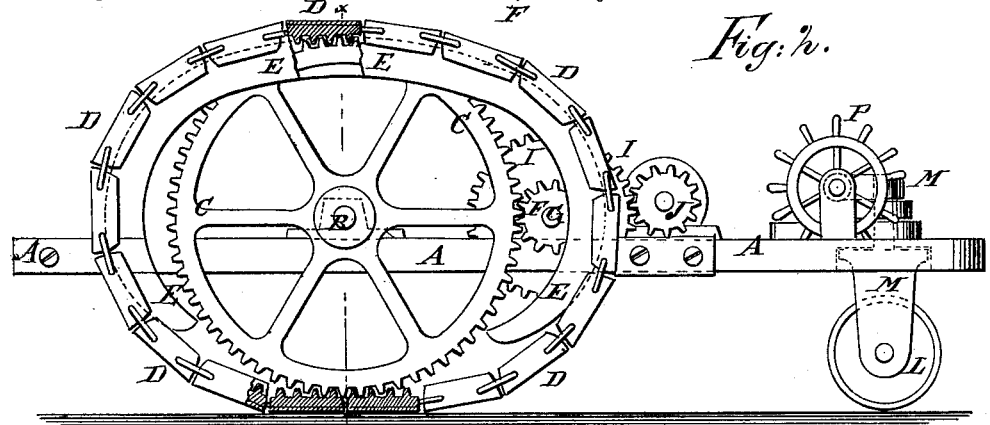
Figure 3:
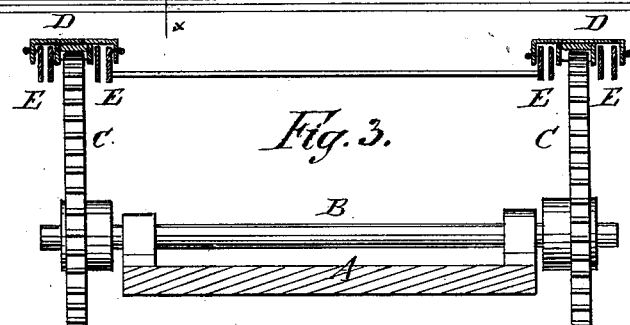

Figure 1 is a plan view, partly in section, of the improvement. Fig. 2 is a side elevation, partly in section. Fig. 3 is a sectional elevation taken through the line $x\ x$, Fig. 2.

Similar letters of reference indicate corresponding parts.

The object of this invention is to furnish traction-engines so constructed that the tracks may be carried forward by the drive-wheels and will be kept securely in place, and that the drive-wheels may be driven by separate engines or by the same engine, as may be desired.

A represents the platform or frame that carries the engine, and to which are attached the bearings for the axle B of the drive-wheels C.

The drive-wheels C have cogs or teeth formed in their rims, which mesh into the teeth of the endless-chain track D.

The track D is formed in sections hinged together at their ends and made of such a breadth as to prevent them from sinking into soft ground. The track D is made longer than the circumference of the drive-wheel C, and is in contact with only the lower and upper sides of the said drive-wheel.

The sections of the track D are supported and guided, while passing up in the rear of the drive-wheel over its top and down in front, by the guide-bars E, which are placed upon the opposite sides of the rims of the drive-wheels, and are supported from the frame A by bolts or arms.

The guide-bars E are made in elliptic form, with the lower part cut away, as shown in Fig. 2.

The track-sections D have flanges along their side edges to keep them in place upon the guide-bars E, and flanges along both sides of their cogs to keep them in place upon the drive-wheels C.

With this construction the drive-wheels C gear with the track-sections at the lower sides of the said wheels to move forward upon the said track-sections, and at the upper sides to carry the said track-sections forward.

The drive-wheels C at their forward sides gear into the small gear-wheels F, placed between the said drive-wheels and the forward parts of the tracks D and guides E.

The gear-wheels F are attached to the outer ends of two shafts, G, which revolve in bearings attached to the frame A.

The shafts G are placed in line with each other, and are provided at their inner ends with a clutch-coupling, H, so that they may be connected together or allowed to work separately, as may be desired.

To each shaft G is attached a gear-wheel, I, the teeth of which mesh into the teeth of the smaller gear-wheel J.

The gear-wheel J is attached to the end of a short shaft which revolves in bearings attached to the frame A, and has a pulley, K, attached to its inner end to receive power from the engine.

With this construction each drive-wheel C may be driven from its own engine, or the shafts G may be coupled and both drive-wheels driven by the same engine. This construction also allows the driving mechanism to be driven at a different speed to assist in guiding and turning the machine.

The forward end of the frame A is supported by a caster-wheel, L, the standard M of which is swiveled to the said frame A.

The upper end of the standard M projects above the frame A, and to it is attached a segmental screw-wheel, N, the teeth of which mesh into the teeth of the endless screw O.

The endless screw O revolves in bearings attached to the frame A, and has a hand-wheel, P, attached to one of its ends, by means of which the machine is steered.

The engine is especially designed for use for drawing plows, but it may also be used for other traction purposes.

Having thus described my invention, I claim as new and desire to secure by Letters Patent—

In a traction-engine, the combination, with the drive-wheels C, of the two sets of gear-wheels and shafts F I J G K, and the clutch-coupling H, substantially as herein shown and described, whereby the drive-wheels may be driven by separate engines or by the same engine, and at the same or a different speed, as set forth.

DAVID J. HAVENSTRITE.

Witnesses:
  ISAAC A. MIDDLESWORTH,
  JACOB LANE.